3,597,210
DIRECT WRITING SILVER HALIDE EMULSIONS
CONTAINING DITHIOCARBAMATES
John Howard Bigelow, Rochester, N.Y., assignor to E. I.
du Pont de Nemours and Company, Wilmington, Del.
No Drawing. Filed Feb. 23, 1968, Ser. No. 707,409
Int. Cl. G03c 1/02
U.S. Cl. 96—94                                  8 Claims

ABSTRACT OF THE DISCLOSURE

Light-developable, direct-writing emulsions are prepared by precipitating the silver halide grains in the presence of a lead ion and then incorporating with the grains after the precipitation a dithiocarbamate, said emulsion being free from polyvalent metal salt halogen acceptors, e.g., stannous chloride.

BACKGROUND OF THE INVENTION

Field of the invention

This invention relates to a process for making light-developable, direct-writing oscillographic recording silver halide layers and elements having improved sensitometric characteristics free from energetic polyvalent metal salt halogen acceptors.

Description of the prior art

Light-developable, direct-writing oscillographic recording papers are described in U.S. Pats. 3,033,678; 3,033,682; 3,178,293; 3,183,088; 3,189,456; 3,249,440. The use of dithiocarbamates in conjunction with energetic halogen acceptors, e.g., stannous ions in direct-writing papers comprising bromide converted silver chloride emulsion when added just before bromide conversion to reduce image access time is known and disclosed in assignee's Bigelow U.S. application Ser. No. 521,449 filed Jan. 18, 1966, U.S. Patent 3,505,069, Apr. 7, 1970.

However, the use of dithiocarbamates as the only energetic halogen acceptors in direct-writing emulsions in which the silver halide grains have been precipitated as silver chloride and then converted to silver chlorobromide does not appear to have been taught in the prior art.

SUMMARY OF THE INVENTION

This invention relates to a process for preparing a light-developable, direct-writing radiation-sensitive oscillographic recording layers comprising a silver halide emulsion containing a dithiocarbamate or derivative thereof and being free from energetic polyvalent metal salt halogen acceptors and to the resulting layers.

The process comprises:

(a) digesting a light-developable, direct writing silver halide emulsion and prior to the completion of digestion or subsequent to completion and prior to coating the emulsion, admixing with the emulsion 0.1 to 25 mole percent of a water-soluble salt of copper or lead based on the silver, and (b) at some stage after formation of the silver halide grains admixing with the uncoated emulsion a solution of an alkali metal, ammonium or piperidinium dithiocarbamate to provide 0.005 to about 2.0 mole percent of said salt based on said silver.

In a more preferred aspect of the invention, the process comprises in the following order:

(1) precipitating silver chloride in an aqueous acidified solution of a water-permeable organic colloid binding agent in the presence of 0.0033 to 1.0 mole of a water-soluble plumbous salt per mole of silver;

(2) ripening the precipitated silver chloride and adding thereto at ripening temperature, from 100 to 200 mole percent based on the silver of a water-soluble bromide.

(3) digesting the resulting silver chlorobromide emulsion and prior to the completion of digestion or coating, mixing with the emulsion based on the silver, a water-soluble salt of copper or lead in an amount of from 0.1 to 25 mole percent; and (4) at some stage after precipitation and prior to coating, adding to the system as an organic solvent or aqueous solution of an alkali metal, ammonium or piperidinium dithiocarbamate to provide 0.005 to about 2.0 mole percent of said salt based on the silver.

The precipitation can be accomplished by means of the usual water-soluble silver salts and water-soluble halides but is preferably carried out in the manner taught in U.S. Pat. 2,178,293 by admixing silver nitrate and a plumbous salt in an aqueous solution with an aqueous acidified solution of a water-soluble halide, e.g., chloride.

An important point is that the dithiocarbamate may be added at any stage after the initial precipitation of silver chloride and prior to the coating of the emulsion on a support.

The process has the advantage that the resulting direct-writing, radiation-sensitive light-developable silver halide emulsions have rapid access time by light-development and may also be wet processed by conventional development.

Suitable other water-soluble silver salts for making silver chlorides and water-soluble bromides are listed in Maffet, U.S. 3,000,737, dated Sept. 19, 1961.

After the addition of soluble bromide (Step 3) the emulsion may or may not be, but preferably is washed in the manner described in Moede U.S. 2,772,165. The emulsion is redispersed and digested as described above. At this point or prior to digestion, optical sensitizing dyes may be added optionally to increase the spectral response of the emulsion layer for instruments employing a variety of light sources.

The dithiocarbamate halogen acceptors for this invention comprise compounds having the general formula:

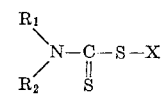

wherein $R_1$ and $R_2$ may be lower alkyl e.g., methyl, ethyl, propyl, butyl or cycloalkyl of from 5 to 6 carbon atoms and X is an alkali metal, e.g., Na and K, ammonium or piperidinium group.

DESCRIPTION OF THE PREFERRED EMBODIMENTS

Preferred halogen acceptors for this invention are dimethyl dithiocarbamate sodium salt and piperidinium pentamethylene dithiocarbamate. In general from 0.05 to 2.0 mole percent and preferably 0.1 to 1.5 mole percent of these halogen acceptors may be used.

After the digestion step, the usual coating adjuvants, e.g., hardeners, wetting agents, etc., are added and the viscosity is adjusted by the addition of a further quantity of gelatin or other colloid. In general, the ratio of gelatin to silver halide is 2:1, however, this is not at all critical. The prepared emulsion is then coated on a suitable support, e.g., paper and dried to give a dry coating weight equivalent to about 30 mg. $AgBr/dm.^2$.

To determine the sensitometric characteristics of the material it may be exposed through a power of 2 step wedge in an electronic flash tube sensitometer similar to that described by Wycoff and Edgerton, Journal of the Society of Motion Picture & Television Engineers, 66

474 (1957). This instrument has a xenon discharge tube as a source of radiation and has available two exposure times of 10 and 10,000 microseconds. The exposed material may be light developed by irradiation under cool white fluorescent lighting at about 50 foot-candle intensity. To determine the densities of the image and background, a reflection densitometer may be used whose values correspond to visual density. Maximum densities ($D_{max.}$) given below in the tables are the densities above background density. The exposing instrument used in the present invention was the Mark VI Edgerton, Germaneshausen and Grier sensitometer. The material was exposed for 0.001 second and photolyzed for 4 minutes at 50 foot-candles under fluorescent room lighting.

The following examples further illustrate but are not intended to limit the scope of the invention.

EXAMPLE I

An initial gelatino-silver chloride emulsion was made by slowly adding an aqueous solution containing a mixture of 1 mole of silver nitrate and 0.33 mole of lead nitrate, i.e., $Pb(NO_3)_2$, to a gelatin solution containing 1 mole of potassium chloride and acidified with 0.05 mole of hydrochloric acid. The precipitation was carried out under a Wratten series 1 safe-light manufactured by the Eastman Kodak Company. The temperature at precipitation and for 40 minutes thereafter was held at 160° F. After precipitation, the emulsion was divided into 7 parts and aqueous solutions of dimethyl dithiocarbamate sodium salt (I) and piperidinium pentamethylene dithiocarbamate (II) were added in the quantities indicated in the following table as the only energetic halogen acceptors in the emulsions. After these additions there was then added to each portion an aqueous solution of potassium bromide in an amount sufficient to provide 1.6 moles of potassium bromide per 1 mole of silver nitrate. The resulting silver chlorobromide emulsion was coagulated, washed, and redispersed in a manner similar to the process described in Moede U.S. Pat. 2,772,165. After the emulsions were redispersed, gelatin necessary to provide about 9% for coating and HCl to give a pH=4.5 were added. Two of the portions served as control coatings as indicated in the table. In addition, 0.02 mole of lead nitrate and 0.6 mole potassium bromide per mole of silver halide were added and the emulsion was digested for 20 minutes at 130° F. After digestion, the mixture was cooled to coating temperature, borax was added as a buffer, coating aids and chrome alum were added, and after adjusting the pH to 4.0 and adjusting to suitable coating viscosity, the emulsions were coated on paper supports to give a dry coating weight equivalent to approximately 40 mg. $AgBr/dm.^2$. The coated emulsions were dried in a conventional manner. Sensitometric strips of the coatings were exposed and light-developed as described above to give the following results.

| Coating number: | Halogen acceptor adjuvant | Quantity, mole percent | $D_{max.}$ | Background density |
|---|---|---|---|---|
| 1 | I | 0.2 | .18 | .17 |
| 2 | I | 0.4 | .24 | .17 |
| 3 | II | 0.2 | .26 | .21 |
| 4 | II | 0.4 | .26 | .28 |
| 5 | II | 0.5 | .26 | .22 |
| 6 | Control | None | .00 | .12 |
| 7 | do | None | .01 | .13 |

EXAMPLE II

Example I was repeated except that only dimethyl dithiocarbamate sodium salt (I) was used as the only energetic halogen acceptor and it was added after the step of converting the silver chloride to silver chlorobromide by the addition of 1.6 moles of potassium bromide per mole of silver chloride. To the emulsion there was added, after coagulation, washing and redispersion, .0556 gram per mole of silver bromide of the optical sensitizing dye, 3-ethyl dihydrobenzoxalylidene - 2:5' - isopropylidine-3-ethyl-2'-thio - 4' - keto tetrahydro-oxazole. The emulsion was treated, coated, dried and exposed as described in Example I above.

The following results were obtained:

| Coating number: | Quantity of halogen acceptor (I) | $D_{max.}$ | Background density |
|---|---|---|---|
| 1 | 1 mole percent | .19 | .17 |
| 2 | 0.1 mole percent | .09 | .11 |
| 3 | None (control) | .00 | .06 |

EXAMPLE III

Five gelatino-silver chlorobromide emulsions were made in the following manner. Into one liter of 2.5% aqueous gelatin solution containing 0.75 mole of potassium chloride and 0.01 mole of plumbous nitrate with the pH adjusted to 2.0, there was added slowly and simultaneously at 160° F., one liter of 1.8 molar potassium chloride and one liter of 1.5 molar silver nitrate to form a silver chloride emulsion, the operation being carried out under the safelight described in Example I. The silver chloride was converted to silver chlorobromide by adding 2.4 moles of potassium bromide as a 3-molar solution. The resulting emulsion was ripened for 40 minutes at 160° F. Dimethyl dithiocarbamate sodium salt (I) was then added to four of the emulsions as the only energetic halogen acceptor in the amounts shown in the following table. The resulting emulsions were ripened for an additional 10 minutes at 160° F., cooled to 95° F. and washed as described in Example I. The emulsions were redispersed, treated, coated, dried and exposed as described in Example I with the following results.

| Coating number: | Quantity of halogen acceptor (I) | $D_{max.}$ | Background density |
|---|---|---|---|
| 1 | 0.5 mole percent | .06 | .10 |
| 2 | 1.0 mole percent | .13 | .16 |
| 3 | 1.5 mole percent | .12 | .12 |
| 4 | 2.0 mole percent | .08 | .10 |
| 5 | Control | .02 | .08 |

EXAMPLE IV

Example III was repeated except that the silver chloride precipitation was carried out at pH 5.7 and in the absence of plumbous nitrate. All other operations were carried out in the manner described above to give the results shown in the following table.

| Coating number: | Quantity of halogen acceptor (I) | $D_{max.}$ | Background density |
|---|---|---|---|
| 1 | 0.5 mole percent | .03 | .24 |
| 2 | 1.0 mole percent | .08 | .26 |
| 3 | 1.5 mole percent | .07 | .30 |
| 4 | 2.0 mole percent | .06 | .28 |
| 5 | 0 (Control) | .02 | .08 |

EXAMPLE V

Example II was repeated except that the dimethyl dithiocarbamate sodium salt (I) was added after washing and at the stage of addition of the excess bromide and optical sensitizing dye and in the quantities shown in the following table. All other operations were carried out as set forth in Example II to give the following results.

| Coating number: | Quantity of halogen acceptor (I) | $D_{max.}$ | Background density |
|---|---|---|---|
| 1 | 0.5 mole percent | .08 | .10 |
| 2 | 1.0 mole percent | .09 | .10 |
| 3 | 1.5 mole percent | .08 | .10 |
| 4 | 2.0 mole percent | .10 | .12 |
| 5 | 0 (control) | .00 | .02 |

Although the examples are directed to precipitating silver chloride and then converting substantially all of the silver chloride to silver bromide by the addition of an excess amount of a soluble bromide to give a silver chlorobromide emulsion, this invention is not so limited. For example the silver halides may be precipitated initially to give a silver chlorobromide emulsion or a silver iodobromide may be formed and used.

In place of the gelatin binding agent used in the foregoing examples there can be substituted synthetic water-permeable organic colloid binding agents. Such agents include water-soluble or water-permeable polyvinyl alcohol and derivatives, e.g., partially hydrolyzed polyvinyl acetates, polyvinyl ethers and acetals containing a large number of extralinear —$CH_2$—CHOH— groups; hydrolyzed interpolymers of vinyl acetate and unsaturated addition polymerizable compounds, for example maleic anhydride, acrylic and methacrylic acid esters and styrene. Suitable colloids of the last mentioned type are disclosed in U.S. Pats. 2,276,322; 2,276,323 and 2,397,866. The useful polyvinyl acetals include polyvinyl acetaldehyde acetal, polyvinyl butyraldehyde acetal and polyvinyl sodium o-sulfobenzaldehyde acetal. Other useful colloid binding agents include polyvinyl lactams of Bolton, U.S. Pat. 2,495,918, e.g., poly-N-pyrrolidone; the hydrophilic copolymers of N-acrylamido alkyl betaines in Shackett U.S. Pat. 2,833,650 and hydrophilic cellulose ethers and esters.

Suitable supports for the novel photographic emulsions of this invention include those used in the prior art for direct-writing oscillographic recording elements. The preferred support is a photographic grade paper but may be any material suitable for coating photographic emulsions such as cellulose ester films and the film base materials disclosed in Alles et al., U.S. Pat. 2,627,088 and Alles U.S. Pat. 2,779,684 and polystyrene. Where paper is used brightening agents of the triazinyl stilbene type may be incorporated either in the emulsions or in the papers themselves.

The novel feature of incorporating dithiocarbamates into a silver halide emulsion after the precipitation stage either with or without additional lead salts and with or without the addition of excess bromide ions produces light-developable, direct-writing, photosensitive emulsion layers having certain advantages over prior art products. In addition to being extremely convenient to use because wet processing can be eliminated, it is also adaptable to conventional chemical development where it is desired. The invention also provides an element wherein one may subject the exposed materials to relatively high illumination for long periods of time or use the material to photographically reproduce the image record using high intensity exposing radiation without serious image deterioration. The elements of this invention have high photographic speed and permit rapid access to the recorded image. They also provide images having high maximum density and image stability. This invention also provides direct-writing photosensitive elements having good aging stability. Still further advantages will be apparent from the foregoing description.

The embodiments of the invention in which an exclusive property or privilege is claimed are defined as follows:

1. A process which comprises the following steps in the order recited:
   (1) precipitating silver chloride in an aqueous acidified solution of a water-permeable organic colloid binding agent in the presence of 0.0033 to 1.0 mole of a water-soluble plumbous salt per mole of silver;
   (2) ripening the precipitated silver chloride and adding thereto at ripening temperature, from 100 to 200 mole percent based on the silver of a water-soluble bromide;
      (a) digesting the resulting silver chlorobromide emulsion and prior to the completion of digestion or coating, mixing with the emulsion based on the silver, a water-soluble salt of copper or lead in an amount of from 0.01 to 25 mole percent; and
      (b) at some stage after precipitation and prior to coating, adding to the system as an organic solvent or aqueous solution of a dithiocarbamate to provide 0.005 to about 2.0 mole percent of said salt based on the silver.

2. A process according to claim 1 wherein said binding agent comprises gelatin.

3. A process according to claim 1 wherein said water-soluble bromide is potassium bromide.

4. A process according to claim 1 wherein the lead salt is plumbous nitrate and the copper salt is copper nitrate.

5. A process according to claim 1 wherein an optical sensitizing dye is admixed with the silver halide emulsion after digestion.

6. A light-developable, direct-writing radiation-sensitive silver halide emulsion free from polyvalent metal salt halogen acceptors and comprising:
   (1) 0.0033 to 1.0 mole of a water-soluble plumbous salt per mole of silver; and
   (2) 0.005 to about 2.0 mole percent, based on the silver, of the alkali metal, ammonium or piperidinium dithiocarbamate defined in claim 3.

7. An emulsion according to claim 6, also comprising:
   (3) from 100 to 200 mole percent, based on the silver, of a water-insoluble bromide.

8. An emulsion according to claim 6, wherein the binding agent for the silver halide comprises gelatin.

References Cited
UNITED STATES PATENTS

| | | | |
|---|---|---|---|
| 3,144,336 | 8/1964 | Herz | 96—108 |
| 3,178,293 | 4/1965 | Bigelow | 96—108 |
| 3,287,137 | 11/1966 | McBride | 96—107 |

NORMAN G. TORCHIN, Primary Examiner

W. H. LOUIE, JR., Assistant Examiner

U.S. Cl. X.R.

96—107, 108